S. S. WALKER.
LOOM-TEMPLE.
No. 169,749. Patented Nov. 9, 1875.
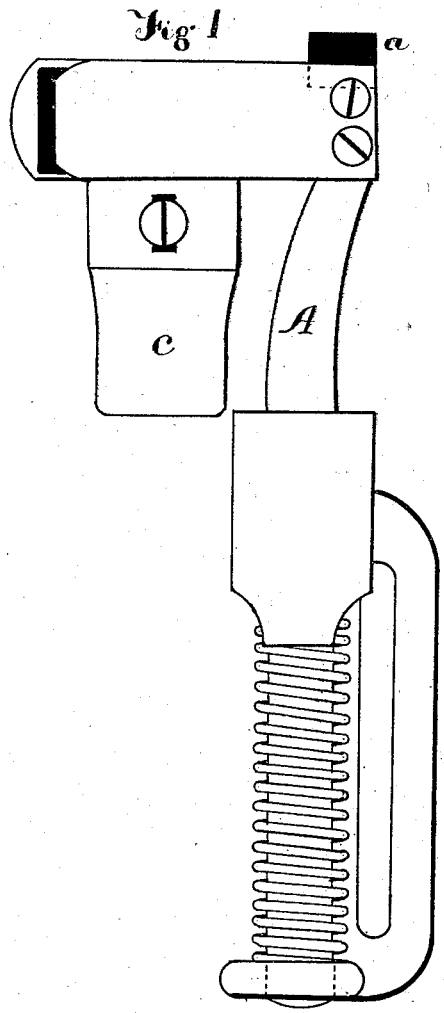
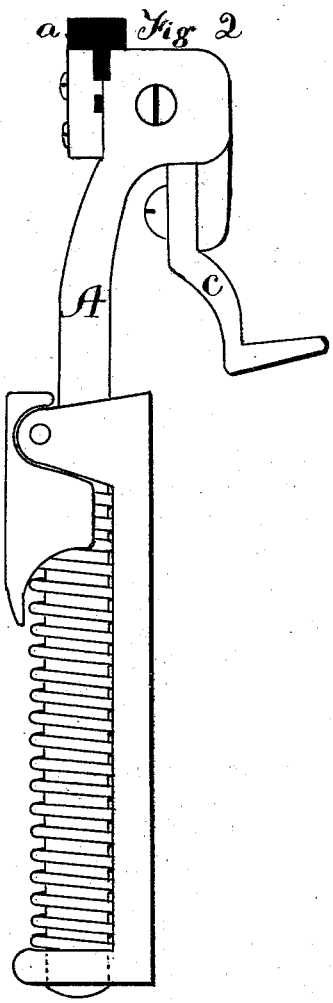
Witnesses.
H. A. Arnold
J. E. Arnold
Inventor.
Samuel S. Walker
By Benj Arnold Atty

UNITED STATES PATENT OFFICE.

SAMUEL S. WALKER, OF CROMPTON, RHODE ISLAND.

IMPROVEMENT IN LOOM-TEMPLES.

Specification forming part of Letters Patent No. 169,749, dated November 9, 1875; application filed September 10, 1875.

*To all whom it may concern:*

Be it known that I, SAMUEL S. WALKER, of Crompton, in the county of Kent and State of Rhode Island, have invented an Improvement in Temples for Looms, of which the following is a specification:

The object of this improvement is to prevent the end of the temple from injuring the reed when the catch against which the lathe strikes in pushing back the temple works loose, or when the face of the lathe where it strikes the catch is worn away, so as to fail in pushing the temple in time. It consists in fastening on the end of the temple a piece of india-rubber or other elastic material that will not injure the reed when it comes in contact with it.

Figure 1 is a top view of the temple. Fig. 2 shows the right-hand side of the same.

A is the main shank of the temple. $c$ is the adjustable catch against which the lathe strikes when beating up the filling. It is necessary for the construction of a good selvage that the temple should work as close as possible to the reed, and frequently the catch $c$ works loose, and, failing to push the temple back as the lathe beats up, allows the reed to strike the end of the temple. As this does not materially change the working of the temple the weaver will not notice it sometimes until the dents of the reed, by continual beating against the end of the temple, are cut into so as to break off. To obviate this I fasten a piece, $a$, of rubber or other elastic material on the end of the temple, where it is kept in place by screwing down the cap of the roller-box upon it; or it may be secured by other means. This piece of rubber, being interposed between the reed and the end of the temple, prevents any damage to the reed in case the catch works loose, or the wearing away of the face of the lathe prevents the temple from being pushed back in the proper way.

What I claim as my invention, and desire to secure by Letters Patent, is—

The combination of the piece $a$, made of rubber or other elastic material, with the temple, substantially as and for the purpose herein set forth.

SAMUEL S. WALKER.

Witnesses:
 ORRIN D. WICKROY,
 BENJ. ARNOLD.